United States Patent [19]

Bishop et al.

[11] Patent Number: 5,078,096
[45] Date of Patent: Jan. 7, 1992

[54] COLLAPSIBLE CONTAINER FOR HOUSING AND CARRIAGE OF PETS

[76] Inventors: Delena K. Bishop, 3 Canyon View Dr., East Missoula, Mont. 59802; Janet Vetaly, 1605 Ninemile Rd., Huson, Mont. 59846

[21] Appl. No.: 641,602

[22] Filed: Jan. 15, 1991

[51] Int. Cl.⁵ ............................................. A01K 1/03
[52] U.S. Cl. ..................................... 119/19; 135/102; 135/116
[58] Field of Search .................. 119/19; 135/100, 102, 135/106, 116, 120

[56] References Cited

U.S. PATENT DOCUMENTS

| | | | |
|---|---|---|---|
| 2,475,515 | 7/1949 | Potter | 135/116 |
| 2,976,876 | 3/1961 | Lönnqvist | 135/102 |
| 3,814,058 | 6/1974 | Thompson | 119/19 |
| 4,585,561 | 8/1989 | Springer | 119/19 |
| 4,665,935 | 5/1987 | Nichols | 135/104 |
| 4,793,286 | 12/1988 | Buxton | 119/19 |
| 4,803,951 | 2/1989 | Davis | 119/19 |

FOREIGN PATENT DOCUMENTS

| | | | |
|---|---|---|---|
| 127005 | 1/1960 | U.S.S.R. | 135/102 |
| 830150 | 3/1960 | United Kingdom | 119/19 |
| 941458 | 11/1963 | United Kingdom | 119/19 |

Primary Examiner—Robert P. Swiatek
Assistant Examiner—Todd E. Manahan
Attorney, Agent, or Firm—Keith S. Bergman

[57] ABSTRACT

A somewhat curvilinear, four-sided pyramidal container is disclosed for housing and carriage of small household pets. The container provides a flexible fabric cover which defines optionally coverable mesh windows and an optionally coverable openable access door structure. The container carries a rigid bottom insert and is supported by a rod frame having a square, releasably intrerconnected bottom element formed of four interconnected semi-rigid rods and two arched, resiliently deformable support rods extending upwardly between opposed corners of the structure, all said rods carried in loops defined on the inner surface of the cover. The support rods are selectively removable to allow assembly and collapse of the structure for storage.

6 Claims, 2 Drawing Sheets

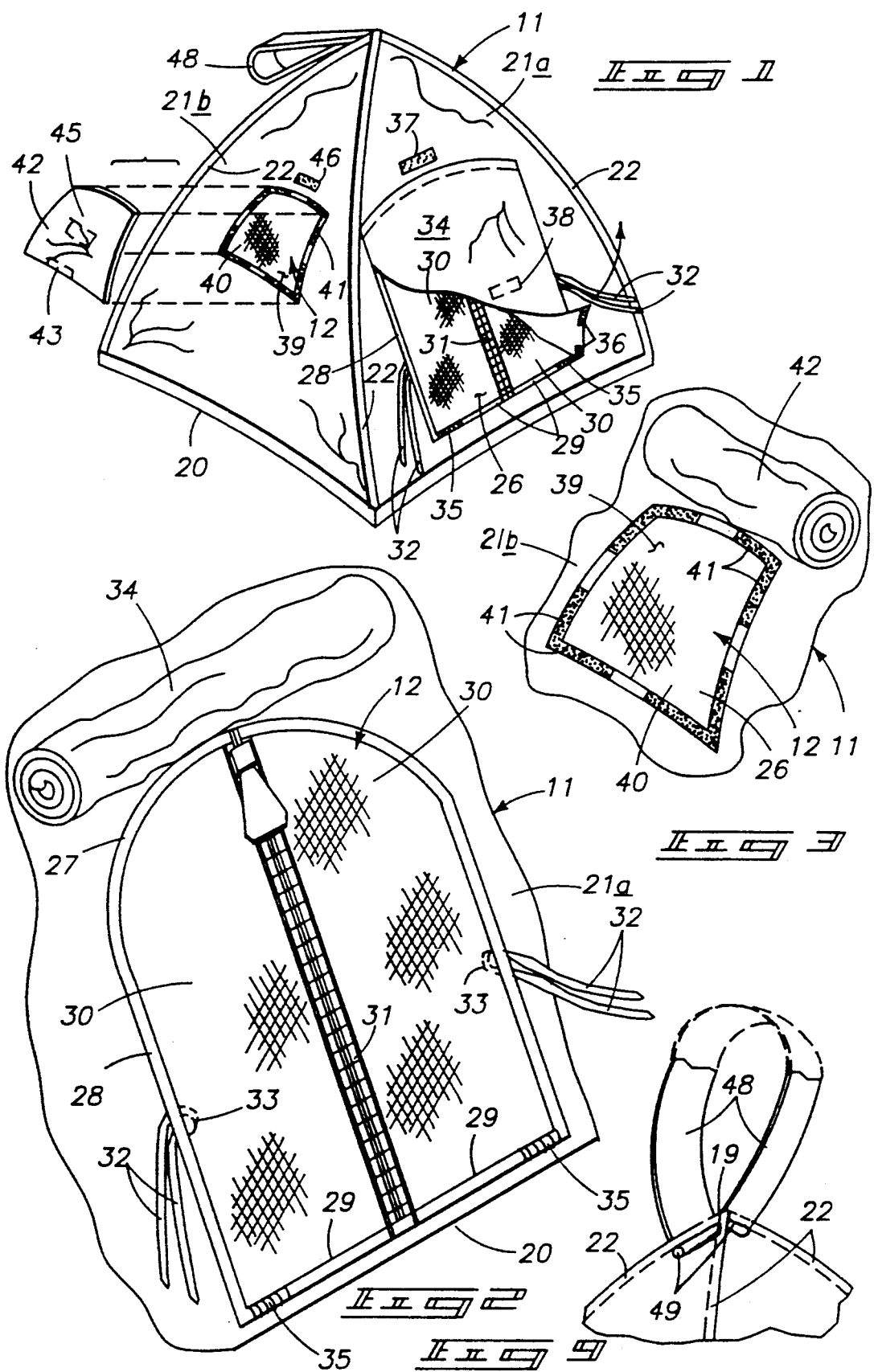

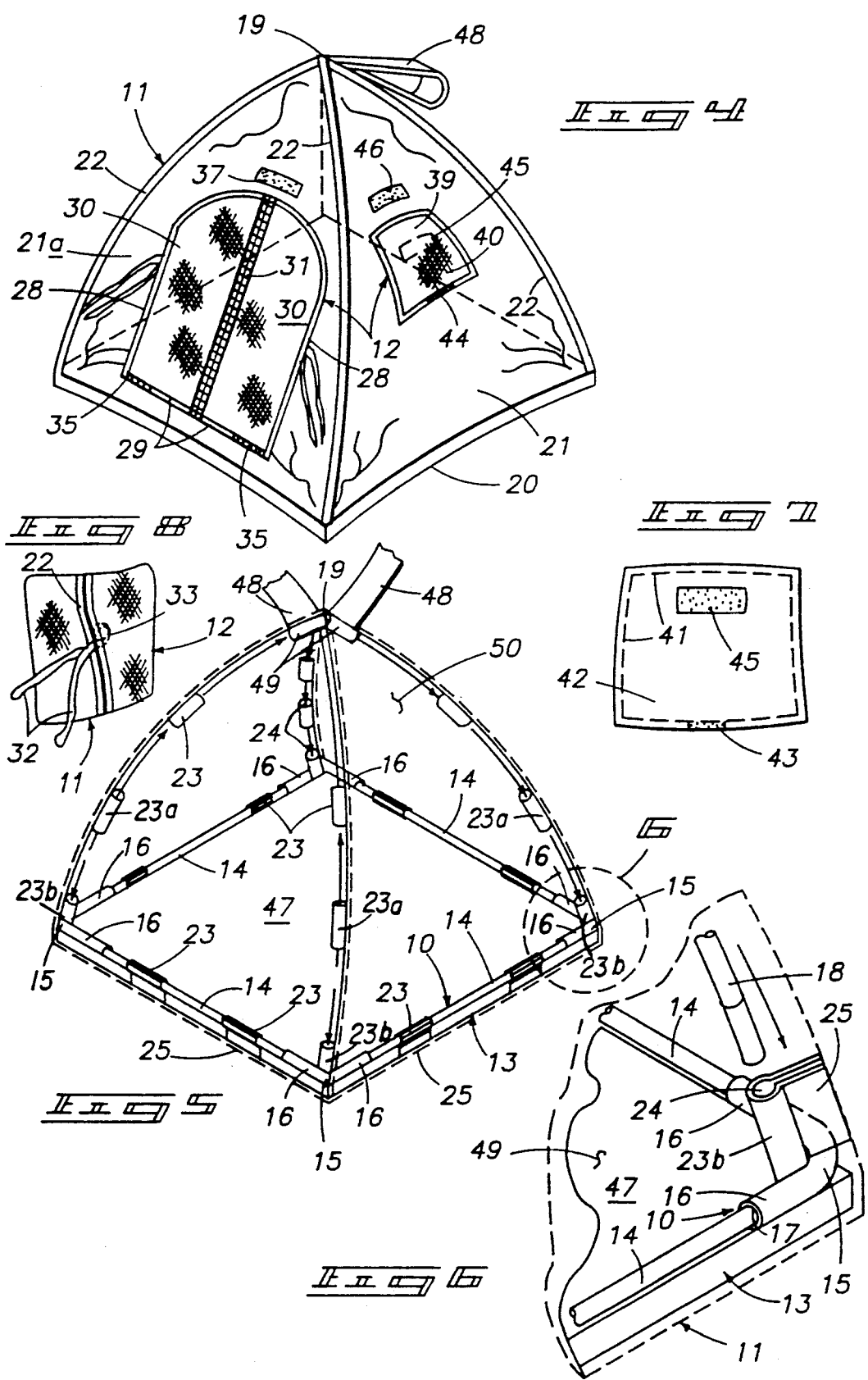

COLLAPSIBLE CONTAINER FOR HOUSING AND CARRIAGE OF PETS

FIELD OF INVENTION

This invention relates generally to containers for housing and carriage of small domestic pets, and more particularly to such a container that has a flexible covering and removable frame to allow collapsibility.

BACKGROUND AND DESCRIPTION OF PRIOR ART

The housing and containment of small household pets, especially for travel, present perennial problems and responsively various devices have heretofore become known to serve such purposes. Generally, known structures have been designed specifically for housing or for carriage, but not for both functions, and most such structures have not been of a collapsible nature. The instant invention in contradistinction provides a container that may be used for housing, containment and carriage of pets, while yet providing collapsibility to a compact form during non-use periods.

Pet housing structures commonly have been created primarily for outdoor use and by reason of this purpose, such structures have generally been formed of massive rigid materials, both to protect the pet from its environment and to provide a reasonably durable structure that is relatively maintenance free. In modern culture, however, many household pets, and especially smaller dogs and cats, are maintained indoors at all or substantially all times and by reason of this large heavy outdoor type housing units are not well adapted for maintenance of such pets. Various structures, in the nature of a basket-like device with internal padding have become known for indoor pet maintenance, but such devices do not provide a containerized space wherein the pet may be confined and in which the pet is substantially enclosed to simulate a primitive den-type habitat which is instinctively desired by most pets, even those of highly domesticated nature. Our invention solves this problem by providing a peripherally defined, light-weight structure that defines a containment chamber with various orifices for selective closure, if pet containment is desired.

Indoor pet housing structures often must be maintained in relatively cramped and crowded environs, and by reason of this, it is desirable that such structures be of a collapsible nature to allow convenient storage during periods of non-use. Neither baskets nor rigid housing units have generally provided collapsibility, and what few rigid housing units have been collapsible have generally had substantial mass and are not collapsible to a small volume of configuration convenient for storage. Our housing structure in contradistinction provides a five-surface pyramidal structure peripherally defined by a flexible fabric cover releasably carrying on its inner surface a rod frame having elements along each edge that interconnect the five pyramidal surfaces. All rods are releasably connected to allow removal and collapse of the peripheral fabric cover into a small, conveniently shaped volume for storage.

It is often necessary for various reasons to transport pets and in so doing it is convenient and sometimes necessary, especially in the case of cats, to confine the animals during transportation or at other times. This need has been recognized, and various containers have become known for such purpose, but generally those containers have been specialized structures usable only for the single purpose of transportation. Our housing structure in distinguishment may be used for pet containment during transportation or at other times without any modification. We provide closed or closable, orifices in the structure to allow pet containment, and we provide a flat, rigid bottom panel that fits upon the bottom element of the flexible peripheral cover to provide appropriate support for a contained animal. A looped strap in the upper portion at the apex of the pyramid provides a handle to aid carriage. Our container is well suited for pet transportation because of its light weight and foldable nature. The container provides an additional benefit in pet transport when it is also used as a housing unit, as the transported animal is habitually familiar with the structure and the transportation process therefore is less upsetting to the animal because of the familiar surroundings.

Our invention resides not in any one of these features per se, but rather in the synergistic combination of all of the structures of our invention that give rise to the functions necessarily flowing therefrom.

SUMMARY OF INVENTION

Our container provides a flexible cover having a square base with four upstanding interconnected triangular sides all interconnected to form a pyramidal configuration. Each interconnecting seam provides a plurality of spaced support loops to releasably carrying elongate, resiliently deformable structural rods that define a framework to support the erected mode of the structure. The square bottom element supports a rigid bottom plate immediately thereabove, and the apex supports a strap loop to aid manual carriage and to interconnect with the frame. At least one pyramidal side defines an access orifice covered by a releasably fastenable mesh door, with an optionally closable, releasably fastenable cover extending thereover. Two sides define mesh covered window structures having associated cover elements releasably fastenable thereover in either open or covering positions. The peripheral cover is formed of woven fabric, and the adjacent end portions of the frame rods are releasably interconnected by friction type rigid connectors.

In providing such a device, it is:

A principal object to create a peripherally defined, four sided pyramidally shaped pet container that may be used as a housing structure and a container for confinement and transportation.

A further object is to provide such a container that has a flexible peripheral cover positionally maintained in erected mode by releasably interconnected rod-like frame elements carried by the cover immediately inwardly adjacent the edges of each of the interconnected elements forming the surfaces thereof.

A further object is to provide such a container that has a rigid bottom element to aid support of a pet during transportation, an access orifice releasably closable by a mesh door and optionally coverable by second external cover, and at least one mesh window with a cover that may be selectively fastened in open and closed positions.

A still further object is to provide such a pet container that is of new and novel design, of rugged and durable nature, of simple and economic manufacture and otherwise well suited to the uses and purposes for which it is intended.

Other and further objects of our invention will appear from the following specification and accompanying drawings which form a part hereof. In carrying out the objects of our invention, however, it is to be remembered that its accidental features are susceptible of change in design and structural arrangement with only one preferred and practical embodiment of the best known mode of operation being illustrated, as is required.

BRIEF DESCRIPTION OF DRAWINGS

In the accompanying drawings, which form a part hereof and wherein like numbers of reference refer to similar parts throughout:

FIG. 1 is an isometric surface view of our container with a window cover removed and the door cover partially opened for clarity of illustration.

FIG. 2 is an enlarged partial isometric surface view of the mesh access door closure and the cover associated therewith.

FIG. 3 is an enlarged partial isometric view of a mesh window with its associated cover.

FIG. 4 is an isometric surface view of the container of FIG. 1, rotated ninety degrees in a horizontal plane from the view of FIG. 1 and with the orifice opening covers removed for clarity of illustration.

FIG. 5 is an isometric view of the support rods and support loops of our invention showing especially the method of inserting the arched uprising support rods in their supporting loops.

FIG. 6 is an enlarged isometric view of a corner fastening element for the end portions of adjacent bottom support rods.

FIG. 7 is a back or inner surface view of a window covering structure showing the fastening elements carried thereby.

FIG. 8 is an enlarged partial isometric view of the tie structure carried by the peripheral portion of the access orifice to selectively hold back the opened mesh door elements.

FIG. 9 is an enlarged isometric view of the inner end portions of the fastening strap showing especially the frame loops formed therein.

DESCRIPTION OF THE PREFERRED EMBODIMENT

Referring to the drawings, it will be seen that my container comprises a generally frame structure 10 carried by and supporting a peripheral cover 11 which defines orifices 12 and carries rigid bottom element 13.

Frame structure 10 provides four similar bottom rods 14 interconnected in square planar array by corner connectors 15. The bottom rods 14 are elongate cylindrical elements of either solid or annular tubular cross-sectional shape, and are of such length that, when interconnected by the corner connectors, the overall length between the most proximate portions of lineally opposed connectors is substantially equal to the length of a side of the rigid bottom 13 and of a side of the bottom of peripheral cover 11. Corner connectors 15 provide structurally interconnected, perpendicularly extending legs 16, each of which defines a channel 17 to slidably receive an end portion of one of the bottom rods 14 in a frictionally maintainable but manually releasable fit. Elongate arched rods 18, both somewhat longer than bottom rods 14, extend upwardly from opposite corners of the bottom element to cross each other at apex 19 of the container. Since the arched rods do cross each other, the upper rod is slightly longer than the lower rod by about one-quarter inch (0.6 cm.) to provide appropriate fits of both rods.

Both bottom and arched rods 14, 18 are formed of semi-rigid, resiliently deformable material so that they may be manually positioned as required in an erected mode and create some tensive force upon the encompassing flexible peripheral cover by reason of their positioning and resiliency. Each of the frame rods, as hereinafter described, is carried in loop structures spacedly defined and carried in the seams of the peripheral cover between adjacent elements forming the cover, to cooperate to provide a stressed composite peripheral element. The material of preference for formation of the support rods is one of the harder, more dense resinous or polymeric plastics, though appropriately sized and more elastic metal or arboreal materials may serve the purposes of my invention.

Peripheral cover 11 provides square bottom 20 and four similar side elements 21, each of a somewhat triangular shape with a straight base and two curvilinear sides. These cover elements are joined at adjacent edges by overlapped type sewn seams 22. The cover elements are formed of flexible sheet-like material having reasonable tensile strength and durability to allow cover stressing, especially during carriage. The preferred material for these cover elements is a woven fabric such as Nylon canvas or material of similar physical characteristics. The seams joining cover elements are preferably sewn with a heavier durable thread formed from polymeric plastics to provide seam strength somewhat similar to the strength of the cover material itself. The seams may be double stitched to aid in accomplishing this goal.

Each of the seams 22 carries at least two spaced frame rod loops 23, and the seams between adjacent sides 21 preferably carry three such loops with one bottom loop defined immediately inwardly of the lower end of each side seam. The frame loops are formed of bands of flexible fabric material folded upon itself to define an elongate loop channel 24 extending inwardly into the container chamber from a seam in which the end portions 25 of the loop are fastened by sewing, normally with the same stitching that forms the seam between cover elements. The frame rod loops should have some substantial width, that is the dimension parallel to the longer dimension of their channels 24, of at least one inch (2.54 cm.) or more to provide appropriate frame support in a normally sized container structure. The loop channels 24 should be only slightly larger in diameter than the diameter of frame rods to be carried therein so that the frame rods may be inserted through the loops for assembly, but yet are securely supported within the loops. With this loop structure and the frame structure previously defined, our container in essence provides a so-called "stressed skin" type construction with the resilient frame immediately inwardly adjacent the cover tending to stress the cover.

Looped handle strap 48 is fastened in the seams between cover sides at or near their common intersection at the apex of the cover structure to aid manual manipulation of the cover, especially during carriage. One end of handle strap 48 is sewn in each of two side seams that are parallel to each other and form a continuous path between two opposed corners. The end portions of each strap are folded upon themselves and sewn to form apex frame loops 49, both loops extending in the direction of the lower arched rod, to receive the medial portion of that arched rod and support it at the apex of the cover. It is possible that any or all frame loops may be formed directly by the seam structure between cover elements without use of separate loop bands, and this construction is within the scope of our invention.

Various screened orifices 12 are defined in the cover side elements. Access orifice 26 is defined in side 21a, which in the common vernacular would be denominated as the front. This orifice in the drawings is defined by an arched top edge 27, two lateral side edges 28 and straight bottom edge 29. The access orifice is provided with closure door 30 formed with two similar halves releasably interconnected by medial vertically extending zipper 31. The closure door is formed of flexible mesh or screen material that is structurally fastened to the cover by sewn seams about its top and side edges, but bottom edges 29 are not fastened to front side 21a so that the door portions may be opened when not fastened to each other by interconnecting zipper 31.

A tie type fastener is provided in a vertically medial position in each side seam joining the closure door portions with the adjacent portion of front side 21a of the peripheral cover. The fastener provides elongate flexible lace 32 sewn in the seam with loop portion 33 extending inwardly relative to the cover and the lace ends extending outwardly therefrom. With this fastener, one end of the lace may be passed over the inner edge of the adjacent side portion of closure door 30, thence through loop 33, back over the inner edge portion of the door element, and thence tied to the other end of the lace to provide a releasable means of fastening a closure door portion to the adjacent side of the access orifice to maintain the door in an open condition when desired.

The access orifice is provided with openable door cover 34 positioned on the outer surface of the peripheral cover and of the closure door. This cover 34 is fastened by sewing its upper portion to the peripheral cover spacedly above arched top 27 of the access orifice. The cover 34 has a size sufficient to extend downwardly from its attachment on the peripheral cover to cover access orifice 26. The cover is formed of flexible, preferably opaque, fabric material so that it may be rolled upwardly for storage in an open condition. Its lower, lateral corners carry one portion 35 of fabric hook and loop fasteners to fasten with complimentary portions 36 carried by the peripheral cover adjacent each lower corner of access orifice 26. A second fabric fastener is carried by the medial portion of the inner surface of the door cover so that when that cover is rolled upwardly, hook and loop fastener portion 37 will engage portion 38 carried by the peripheral cover spacedly above the medial portion of arched top 27 of the access orifice to releasably maintain the door cover in a rolled open position.

Window orifices 39, areally smaller than the access orifice 26, are defined in at least one and preferably two cover sides 21b that are opposite each other and adjacent cover front 21a. These window orifices are defined at a somewhat higher average elevation than the access orifice and in the medial portion of each side element 21b. Each window orifice is covered by mesh 40 structurally communicating about its periphery with peripheral cover 11 by means of seams 41 which may be formed by sewing, adhesion or the like.

Each window orifice has an external window cover 42 attached in its upper portion by sewing to peripheral cover 11 immediately above the upper portion of window orifice 39. This cover provides hook and loop type fabric fastener portion 43 in the medial portion of its lower edge to contact complimentary fastener portion 43 carried by the peripheral cover, in a mating position immediately below the window orifice, to releasably fasten the cover in a covering position. A second fabric fastener portion 45 is carried on the inner surface of cover 42 in a medial position, spacedly below the upper edge of the cover, so that when when the window cover is rolled upwardly to an open position this fastener portion 45 will come into engagement with complimentary fastener portion 46 carried on the peripheral cover, spacedly above the attachment of the window cover therewith, to maintain the open position as illustrated particularly in FIG. 3.

Rigid bottom 13 provides square planar plate 47 having a size and peripheral configuration such as to fit immediately upwardly adjacent bottom element 20 of the peripheral cover, with its periphery substantially coincident with the seams between the bottom element 20 and sides 21. This bottom element must be rigid to fulfill its purpose and should be of reasonably low mass to allow convenient carriage of our container. A material that we found well suited for this purpose is one of the thinner pressed boards formed to a dense consistency from particulated arboreal matter and binders, such as tempered Masonite. The plate 47 fits immediately upwardly adjacent the upper surface of bottom 20 of the peripheral cover element 11, with the bottom frame rods 14 and their corner connectors 15 resting immediately above the plate or immediately outwardly adjacent the periphery thereof, depending on the desired construction.

Preferably, access orifice 26 is of such size and shape that it may be deformed to allow the passage of plate 47 therethrough after formation of the peripheral cover, but if not, the plate will have to be positioned within chamber 50 defined by the peripheral cover prior to complete formation of that peripheral cover. The bottom plate serves a dual purpose of providing a rigid support for an animal being transported in the container and also of creating appropriate stress in the bottom portion of the fabric container to aid maintenance of the container shape, especially when weighted by the mass of a pet during carriage. The bottom plate may be covered with a padded flexible covering on its upper surface or may support a padded, physically separate flexible pillow (neither of which are shown) if desired, as known in the animal husbandry arts to further enhance pet comfort.

Having thusly described our invention, its operation and use may be understood.

The peripheral cover is formed as specified, commonly by creating five separate elements comprising the sides and bottom and joining those elements at intersecting edges by overlapped sewn seams. At the same time, the several frame rod loops are established in the seams, extending inwardly from the cover inside surface, and are fastened during the seam fastening operation. The seams, if sewn, are preferably doubly stitched to add strength and durability to the structure. Prior to assemblage of the cover elements, the various orifices are created in the side elements defining them and those orifices are covered with flexible mesh in the fashion specified. The various ties, orifice covers and fabric fasteners associated with the orifices are established and fastened by sewing, adhesion or otherwise as indicated. If bottom plate 47 will not pass through access orifice 26 by appropriate deformation of the cover, the plate is established within the chamber defined by peripheral cover 11 prior to the complete formation of the cover element.

The peripheral cover is assembled in an inside-out manner to allow creation of its seams. When the cover is formed, three bottom rods 14 are inserted in the rod loops in seams between three adjacent cover sides and the cover bottom and the adjacent rod ends are interconnected by connectors 15. The cover is then turned right-side out by appropriate manipulating the cover and partial bottom frame structure through access orifice 26, aided by appropriate deformation of the cover material about that orifice as necessary. The fourth bottom rod is then inserted into container chamber 50, established in the rod loops of the forth seam between cover sides and bottom and its ends are interconnected by connectors 15 to the ends of the bottom rod structure already in place, as illustrated in FIGS. 5 and 6.

With the container in this partially assembled condition, a first end of the shorter and lower arched rod 18 is inserted into container chamber 50 through access orifice 26 and a first end portion of that rod is inserted through loop 23a which is the first loop spacedly above loop 23b that is at the lower end of that seam. The lower rod is then inserted sequentially through each next adjacent loop moving upwardly to the apex of that seam where it is inserted through first strap loop 49 and thence downwardly from the apex of the diagonally continuing seam through the second strap loop and sequential adjacent loops until the first end of the lower arched rod comes to rest in the diagonally opposed loop 23b. The second end of the rod 18 is then inserted in the loop 23b at the bottom of the seam where the insertion originally began, to complete the containment of that lower arched rod in the associated lops. The same procedure is then followed by inserting the second longer and upper arched rod 18 in the loops carried by the diagonally positioned seam, and between the strap loops and over the lower arched rod. This upper rod positioning at the apex area of our container will positionally maintain the upper rod between the two strap loops and the peripheral cover above and lower arched rod below. The insertion of the arched rods in the fashion described is accomplished by appropriate manual manipulation of the rods in conjunction with the deformability of the rods and peripheral cover. After the arched rods have been inserted, the housing structure is in its assembled mode, as shown in FIG. 1. The bottom plate 47 is then inserted through the access orifice by appropriate deformation of the peripheral cover and the container is in its assembled mode and ready for use. The container may be returned to its collapsed mode (not shown) or any partially assembled stage by reversing the assemblage process described.

For use, the access orifice cover and window covers may be released from their covering position by manual manipulation of the associated fabric fasteners, and the covers may be rolled upwardly to an open position and there positionally maintained by the fasteners associated with each cover. Cover door 30 with access opening 26 may be opened or closed by operation of medial zipper 31 and if it be desired that the cover door be maintained in an opened condition for animal access, each side may be tied back in open position by laces 32.

It is to be particularly noted from the foregoing description that the configuration of the peripheral cover, the configuration and dimensioning of the rigid bottom and the lengths of various rods of the support structure associated with the cover all cause a stress in the cover that tends to maintain its erected configuration against displacement. The weight of a pet on the rigid bottom during carriage does not materially change this situation and in fact may tend to enhance it.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and

What we claim is:

1. A container for housing, confining and carrying small domestic pets comprising, in combination:
   a flexible pyramidally shaped peripheral cover having a bottom, similar upstanding sides and an apex portion, one of said sides defining an access orifice having an openable closure door, said cover having a plurality of inwardly extending frame rod loops carried in spaced relationship along each pyramidal edge, with at least one frame loop at the bottom of each pyramidal side edge, and
   strap means in the apex portion of said cover and extending therefrom to aid carriage;
   a planar rigid bottom element of peripheral size and configuration similar to the bottom element of the peripheral cover, said rigid bottom element carried immediately upwardly adjacent the peripheral cover bottom;
   a frame structure having four elongate flexible bottom rods extending through frame rod loops defined at the edges between the bottom and sides of the peripheral cover, said bottom rods releasably joined by corner connectors in planar array substantially similar to the periphery of the rigid bottom element and two elongate arched rods extending, through the frame rod loops defined at the edges between peripheral cover sides, diagonally from one bottom corner to an opposite corner.

2. The structure of claim 1 wherein:
   at least one peripheral cover side defines a window orifice having a mesh element therein and an associated cover element with first releasable fastening means to maintain the cover element in covering position and second releasable fastening means to maintain the cover element in open position above the window orifice.

3. The structure of claim 1 wherein:
   the strap means to aid carriage extends outwardly from the apex to form a looped handle, the said strap means carried in two parallel continuous side seams with end portions extending inwardly from said seams and folded upon themselves to form frame loops at each end.

4. The invention of claim 1 wherein:
   said closure door comprises two similar portions releasably joined together along adjacent vertical edges medially of said access orifice by a fastening means, each of said closure door portions being fastened to the periphery of the access orifice about peripheral edges except at a bottom edge, and fastening means associated with each side edge of the access orifice to releasably to maintain the adjacent closure door portion in an open condition; and
   a closure door cover, having configuration to cover the closure door, said door cover carried by the peripheral cover above the access orifice, said door cover having first means for releasable fastening in a closed position and second means for releasable fastening said door cover in an open position.

5. A collapsible container for housing, confinement and transport of small domestic pets comprising, in combination:

a flexible fabric peripheral cover having a square bottom and four similar triangular sides forming an enclosed four-sided pyramidal structure with upstanding apex, a first of said triangular sides defining an access orifice covered by a closure door vertically divided into two similar portions releasably joinable along adjacent vertical edges, each of said closure door portions carried by adjacent edges of the peripheral cover defining the access orifice, except at a bottom of the access orifice, at least another of said triangular sides defining a window orifice covered by a mesh element therein and having an associated openable cover, carried by the peripheral cover adjacent the window orifice, and each of the edges between triangular sides defining plural spaced frame rod loops extending inwardly into a chamber defined by the peripheral cover, each of said frame rod loops defining a channel to supportably receive a frame rod, and strap means carried in two adjacent side seams adjacent the peripheral cover apex with a loop handle extending outwardly from the peripheral cover and strap ends extending inwardly from said cover to define a frame loop support at each end immediately adjacent the inner surface of the peripheral cover;

a rigid bottom plate having peripheral configuration similar to the square bottom of the peripheral cover, said bottom plate carried on an inner surface of the square bottom of the peripheral cover; and a frame to support the peripheral cover in a erected pyramidal shape, said frame having four resiliently deformable elongate bottom support rods carried in frame rod loops along each edge between each side element and the bottom element, adjacent ends of said bottom support rods releasably interconnected by connecting elements and said rods having a length to form a configuration substantially coincident with the periphery of the rigid bottom plate, and two resiliently deformable elongate arched support rods carried in the frame rod loops along each of seams diagonally extending from one pyramidal corner to the apex and thence to the opposite corner to support the peripheral cover in an erected pyramidal configuration.

6. The structure of claim 5 wherein:

the access orifice has a cover fastened at an upper portion to the peripheral cover immediately above the access orifice, said access orifice cover having first releasable fastening means for maintaining the said cover in a covering position over the access orifice and second releasable fastening means for maintaining the cover in an open position, the access orifice having lace means at each side edge to releasably fasten the closure door portions in an opened position.

* * * * *